(12) United States Patent
Yoon et al.

(10) Patent No.: US 9,160,039 B2
(45) Date of Patent: Oct. 13, 2015

(54) BATTERY CELL OF EXCELLENT HEAT DISSIPATION PROPERTY AND MIDDLE OR LARGE-SIZED BATTERY MODULE EMPLOYED WITH THE SAME

(75) Inventors: Hee Soo Yoon, Daejeon (KR); Shinichi Jinushi, Otsu (JP); Jin Kyu Lee, Busan (KR); Dal Mo Kang, Daejeon (KR); Jongmoon Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 961 days.

(21) Appl. No.: 12/743,745

(22) PCT Filed: Oct. 30, 2008

(86) PCT No.: PCT/KR2008/006391
§ 371 (c)(1),
(2), (4) Date: Sep. 17, 2010

(87) PCT Pub. No.: WO2009/066881
PCT Pub. Date: May 28, 2009

(65) Prior Publication Data
US 2011/0008666 A1   Jan. 13, 2011

(30) Foreign Application Priority Data
Nov. 21, 2007 (KR) .......... 10-2007-0119032

(51) Int. Cl.
*H01M 10/613* (2014.01)
*H01M 2/02* (2006.01)
*H01M 10/625* (2014.01)
(Continued)

(52) U.S. Cl.
CPC ........ *H01M 10/5004* (2013.01); *H01M 2/0212* (2013.01); *H01M 2/0275* (2013.01); *H01M 10/5016* (2013.01); *H01M 10/5032* (2013.01); *H01M 10/5053* (2013.01); *H01M 10/613* (2015.04); *H01M 10/625* (2015.04); *H01M 10/647* (2015.04); *H01M 10/6554* (2015.04); *H01M 2/0287* (2013.01); *H01M 2/0295* (2013.01); *H01M 10/052* (2013.01); *Y02T 10/7011* (2013.01)

(58) Field of Classification Search
CPC ............ H01M 2/0212; H01M 2/0275; H01M 2/0287; H01M 2/0295; H01M 10/5004; H01M 10/052; H01M 10/5016; H01M 10/5032; H01M 10/5053; Y02T 10/7011
See application file for complete search history.

(56) References Cited

U.S. PATENT DOCUMENTS 6,087,036 A      7/2000  Rouillard et al.
6,821,671 B2 *  11/2004  Hinton et al. .................. 429/120
(Continued)

FOREIGN PATENT DOCUMENTS

JP       2004-47262 A      2/2004
JP       2004-071179 A     3/2004
(Continued)

*Primary Examiner* — Raymond Alejandro
(74) *Attorney, Agent, or Firm* — Birch, Stewart, Kolasch & Birch, LLP

(57) ABSTRACT

Disclosed herein is a battery cell constructed in a structure in which an electrode assembly of a cathode/separator/anode structure is mounted in a battery case formed of a laminate sheet including a resin layer and a metal layer while the electrode assembly is connected to electrode terminals extruding out of the battery case, wherein the battery cell is constructed in a structure to accelerate heat dissipation by the heat conduction through at least some of a sealing part of the battery case where the electrode terminals are not located.

14 Claims, 3 Drawing Sheets

(51) Int. Cl.
*H01M 10/647* (2014.01)
*H01M 10/6554* (2014.01)
*H01M 10/052* (2010.01)

(56) References Cited

U.S. PATENT DOCUMENTS

2004/0043289 A1* 3/2004 Shimamura et al. .......... 429/162
2005/0074666 A1* 4/2005 Kimiya et al. ................. 429/62
2005/0110460 A1   5/2005 Arai et al.
2006/0093904 A1* 5/2006 Cheon et al. .................. 429/163
2006/0216583 A1   9/2006 Lee et al.
2006/0286450 A1   12/2006 Yoon et al.

FOREIGN PATENT DOCUMENTS

| | | | |
|---|---|---|---|
| JP | 2006-128038 A | 5/2006 | |
| JP | 2006-310739 A | 11/2006 | |
| JP | 2007-123016 A | 5/2007 | |
| JP | 2007-273348 A | 10/2007 | |
| KR | 10-2005-0118847 B1 | 12/2005 | |
| WO | WO 2007/126243 * | 11/2007 | ............. H01M 2/30 |

\* cited by examiner

BATTERY CELL OF EXCELLENT HEAT DISSIPATION PROPERTY AND MIDDLE OR LARGE-SIZED BATTERY MODULE EMPLOYED WITH THE SAME

TECHNICAL FIELD

The present invention relates to a battery cell of excellent heat dissipation property, and, more particularly, to a battery cell constructed in a structure in which an electrode assembly of a cathode/separator/anode structure is mounted in a battery case formed of a laminate sheet including a resin layer and a metal layer while the electrode assembly is connected to electrode terminals extruding out of the battery case, wherein the battery cell is constructed in a structure to accelerate heat dissipation by heat conduction through at least some of a sealing part of the battery case where the electrode terminals are not located.

BACKGROUND ART

As mobile devices have been increasingly developed, and the demand of such mobile devices has increased, the demand of battery cells has also sharply increased. Among them is a lithium battery cell having high energy density and operating voltage and excellent preservation and service-life characteristics, which has been widely used as an energy source for various electronic products as well as for the mobile devices.

Based on their external and internal structures, battery cells are generally classified into a cylindrical battery, a prismatic battery, and a pouch-shaped battery. Especially, the prismatic battery and the pouch-shaped battery, which can be stacked with high integration and have a small width to length ratio, have attracted considerable attention.

Also, the battery cells have attracted considerable attention as an energy source for electric vehicles and hybrid electric vehicles, which have been developed to solve problems, such as air pollution, caused by existing gasoline and diesel vehicles using fossil fuel. As a result, kinds of applications using the battery cells are being increased owing to advantages of the battery cells, and hereafter the battery cells are expected to be applied to more applications and products than now.

As kinds of applications and products, to which the battery cells are applicable, are increased, kinds of batteries are also increased such that the batteries can provide powers and capacities corresponding to the various applications and products. Furthermore, there is a strong need to reduce the sizes and weights of the batteries applied to the corresponding applications and products.

For example, small-sized mobile devices, such as mobile phones, personal digital assistants (PDA), digital cameras, and laptop computers, use one or several small-sized, light-weighted battery cells for each device according to the reduction in size and weight of the corresponding products. On the other hand, middle- or large-sized devices, such as electric vehicles and hybrid electric vehicles, use a middle- or large-sized battery module (which may be referred to as a "battery pack") having a plurality of battery cells electrically connected with each other because high power and large capacity is necessary for the middle- or large-sized devices. The size and weight of the battery module is directly related to the receiving space and power of the corresponding middle- or large-sized device. For this reason, manufacturers are trying to manufacture small-sized, light-weighted battery modules.

Meanwhile, as battery cells are connected to one another, while the battery cells are stacked, to increase the capacities of battery modules, the dissipation of heat from the battery cells becomes serious. Heat is generated from lithium battery cells during the charge and discharge of the lithium battery cells. If the heat is not effectively removed, the heat accumulates in the respective lithium battery cells, with the result that the deterioration of the lithium battery cells is caused, and the safety of the lithium battery cells is greatly lowered. In particular, for a battery requiring high-speed charging and discharging characteristics as in a power source for electric vehicles and hybrid electric vehicles, a large amount of heat is generated from the battery at the time when the battery instantaneously provides high power.

Also, a laminate type battery case of a pouch-shaped battery widely used in the battery module is coated with a polymer material exhibiting low heat conductivity, with the result that it is difficult to effectively lower the overall temperature of the battery.

In connection with this matter, for example, Japanese Patent Application Publication No. 2005-302502 discloses a case for supporting a battery cell including a battery element of which the outer surface is formed of a laminate film and cathode and anode terminals for charge and discharge connected to the battery element, the cathode and anode terminals extruding from the laminate film, wherein a plate member having a plurality of empty spaces constitutes an upper body of a frame, the plate member being connected to another plate member in the thickness direction thereof, the inner circumferential part of the upper body of the frame serves as a support part for supporting four points of the battery element around the battery element, and the inner circumferential part of the upper body of the frame communicates with the outer circumferential part of the upper body of the frame such that the empty spaces are connected to one another. However, the above-mentioned technology has problems in that it is necessary to manufacture a battery cell case in a complicated structure and mount the battery cell case to a battery, which is troublesome, and, when batteries are stacked to manufacture a battery module, the thickness and volume of the battery module are greatly increased.

Therefore, there is a high necessity for a technology that is capable of fundamentally solving the above-mentioned problems.

DISCLOSURE OF INVENTION

Technical Problem

Therefore, the present invention has been made to solve the above problems, and other technical problems that have yet to be resolved.

As a result of a variety of extensive and intensive studies and experiments on a cutting frame, the inventors of the present invention have developed a battery cell constructed in a structure to accelerate heat dissipation by the heat conduction through at least some of a sealing part of a battery case where no electrode terminals are located, and found that it is possible to effectively improve heat dissipation efficiency while not increasing the thickness of the battery cell. The present invention has been completed based on these findings.

Technical Solution

In accordance with one aspect of the present invention, the above and other objects can be accomplished by the provision of a battery cell constructed in a structure in which an electrode assembly of a cathode/separator/anode structure is mounted in a battery case formed of a laminate sheet including a resin layer and a metal layer while the electrode assembly is connected to electrode terminals extruding out of the battery case, wherein the battery cell is constructed in a structure to accelerate heat dissipation by the heat conduction through at least some of a sealing part of the battery case where the electrode terminals are not located.

That is, the battery cell according to the present invention is constructed in a structure to accelerate heat dissipation through the sealing part of the battery case where no electrode terminals are located, whereby it is possible to easily discharge heat generated during the charge and discharge of the battery cell to the outside, and therefore, it is possible to maximize the heat dissipation efficiency of the battery cell.

In a preferred embodiment, the heat dissipation accelerating structure through the sealing part is a structure in which at least some of the sealing part extends such that the at least some of the sealing part is longer than the remaining sealing part or a structure in which a thermally conductive member is coupled to the sealing part.

In the structure having the extending sealing part or in the structure in which the thermally conductive member is coupled to the sealing part, as described above, heat generated from the battery cell due to ion occlusion/deocclusion reaction between a cathode active material and an anode active material during the charge and discharge of the battery cell is absorbed by the extending sealing part or the thermally conductive member coupled to the sealing part, and then the absorbed heat is effectively discharged out of the battery cell.

The battery cell as described above is more preferably used in the structure of a battery module including a plurality of battery cells stacked. That is, when the battery cells are stacked in a structure in which the battery cells are in tight contact with each other, or in a structure in which the battery cells are adjacent to each other, to construct a battery module, it is difficult to dissipate heat generated from the battery cells to the outside due to the structure in which the battery cells are close to each other. Even in the stacked structure, however, the sealing parts of the respective battery cells are not close to each other. According to the present invention, it is possible to effectively dissipate the heat generated from the battery cells to the outside through the sealing parts of the respective battery cells.

Also, the structure having the extending sealing part or the structure in which the thermally conductive member is coupled to the sealing part exhibit a high heat dissipation property while not reducing the productivity of the battery cells due to the simple structural characteristics thereof.

According to the present invention, the battery cell is not particularly restricted so long as the battery cell is a secondary battery that can be charged and discharged. For example, a lithium secondary battery, a nickel-metal hydride (Ni-MH) secondary battery, or a nickel-cadmium (Ni—Cd) secondary battery may be used as the battery cell. Preferably, the lithium secondary battery is used as the battery cell, since the lithium secondary battery provides a high power to weight ratio.

Based on its shape, the lithium secondary battery may be classified as a cylindrical battery, a prismatic battery, or a pouch-shaped battery. The battery cell according to the present invention is applied to a battery having a sealing part thermally welded at an outer circumference end region thereof. In a preferred embodiment, the battery cell according to the present invention is a light-weighted pouch-shaped battery constructed in a structure in which an electrode assembly is mounted in a battery case formed of a laminate sheet including an inner resin layer, which is thermally weldable, an isolation metal layer, and an outer resin layer exhibiting excellent durability.

It is preferred to appropriately adjust the size of the extending sealing part within a range in which the heat dissipation efficiency of the battery cell is maximized while the total volume of the battery cell is not increased. For example, therefore, the extending sealing part may have an extension length equivalent to 150 to 400% of the width of the remaining sealing part.

Also, the extending sealing part may be equivalent to more than 50%, preferably more than 70%, of the length of the sealing part of the battery cell where the extending sealing part is formed. The extending sealing part may extend in a single continuous structure or in two or more discontinuous structures in the longitudinal direction of the sealing part.

The thermally conductive member may be coupled to a general sealing part or the above-described extending sealing part. The latter coupling structure is more preferred.

In a preferred embodiment, at least some of the thermally conductive member is joined to the outer surface of the sealing part.

In this structure, for example, the thermally conductive member may be formed of a plate-shaped member having a size greater than the width of the sealing part. When the width of the thermally conductive member is greater than the width of the sealing part, it is possible to exhibit a high heat dissipation property due to the large heat dissipation surface area.

The thermally conductive member may be coupled to the sealing part in various fashions. For example, the thermally conductive member may be coupled to the sealing part in a mechanical coupling fashion, in an adhesive fashion, or in a thermal welding fashion.

When the thermally conductive member is coupled to the sealing part in the adhesive fashion, an adhesive may be applied to one major surface of the thermally conductive member or the sealing part corresponding to the one major surface of the thermally conductive member, and then the thermally conductive member is pressed against the sealing part such that the thermally conductive member is attached to the sealing part. In this case, any general bonding agents may be used as the adhesive. According to circumstances, an additive to increase heat conductivity may be added to the adhesive.

When the thermally conductive member is coupled to the sealing part in the thermal welding fashion, the thermally conductive member, which is a thin plate-shaped member, is coupled to the outer surface of the sealing part by thermal welding. This coupling structure hardly increases the overall thickness of the battery cell, and therefore, this coupling structure is particularly preferred when manufacturing a compact battery module by stacking a plurality of battery cells.

In another preferred embodiment, the thermally conductive member is a plate-shaped member having a size greater than the width of the sealing part, and at least some of the thermally conductive member is thermally welded to the laminate sheet while being interposed between upper and lower parts of the laminate sheet.

Generally, the battery cell is manufactured by placing an electrode assembly in a battery case formed of a laminate sheet and thermally welding the outer circumference of the battery case. Before thermally welding the battery case, the thermally conductive member is interposed between the upper laminate sheet and the lower laminate sheet at the outer circumference of the battery case where no electrode terminals are located, and then the thermal welding is carried out such that the thermally conductive member is coupled to the upper laminate sheet and the lower laminate sheet. As a result, it is possible to easily manufacture the battery cell having the thermally conductive member coupled thereto without an additional process. By this coupling structure, therefore, it is possible to more stably couple the thermally conductive member to the battery case while not complicating the battery manufacturing process.

Meanwhile, the thermally conductive member may be appropriately modified into a structure to increase heat dissipation efficiency and coupling to the sealing part. Preferably, the thermally conductive member has an outer circumferential end thermally welded to the sealing part, and the outer circumferential end of the thermally conductive member is constructed in a concavo-convex structure on a horizontal plane, thereby increasing a coupling force between the thermally conductive member and the laminate sheet while securing a large thermally welded area between the upper and lower parts of the laminate sheet.

The concavo-convex structure formed at the outer circumferential end of the thermally conductive member is not particularly restricted so long as the concavo-convex structure can increase a coupling force between the thermally conductive member and the sealing part. For example, the concavo-convex structure may be a saw-toothed concavo-convex structure or a wave-shaped concavo-convex structure.

In another example, the thermally conductive member may have an outer circumferential end thermally welded to the sealing part, and the outer circumferential end of the thermally conductive member may be constructed in a concavo-convex structure on a vertical sectional plane, thereby increasing a coupling force between the thermally conductive member and the laminate sheet.

The concavo-convex structure on the horizontal plane or the concavo-convex structure on the vertical sectional plane increases a coupling force between the thermally conductive member and the sealing part, and, in addition, greatly increases the contact interface between the thermally conductive member and the sealing part. Consequently, it is possible to further improve the heat dissipation efficiency of the battery.

According to circumstances, the thermally conductive member may have an outer circumferential end thermally welded to the sealing part, and one or more through-holes may be formed in the outer circumferential end of the thermally conductive member such that the upper and lower parts of the laminate sheet are partially thermally welded to each other via the through-holes.

The thermally conductive member is not particularly restricted so long as the thermally conductive member is made of a material exhibiting excellent heat conductivity and is formed in a thin shape. Preferably, the thermally conductive member is formed of a metal or carbon plate, which exhibits heat conductivity higher than other materials, or a polymer sheet containing metal powder or carbon powder, which exhibits heat conductivity higher than other materials.

When the thickness of the thermally conductive member is too large, the volume and weight of a battery module may increase during the stacking of the battery cells to manufacture the battery module. On the other hand, when the thickness of the thermally conductive member is too small, it is difficult to expect a desired heat dissipation effect, and it is difficult to handle the thermally conductive member. For example, therefore, the thickness of the thermally conductive member may be equal to or greater than the thickness of the laminate sheet.

Meanwhile, a plurality of battery cells are stacked to construct a middle- or large-sized battery module such that the middle- or large-sized battery module provides high power and large capacity. The battery cells, used as unit cells of the battery module, are required to exhibit high heat dissipation efficiency, which is necessary to secure the safety of the battery module, as well as operational properties.

Therefore, the thermally conductive member may be constructed in a structure to contact a heat exchange medium. For example, the structure to contact the heat exchange medium may be a structure in which a heat exchange member having a channel through which the heat exchange medium (for example, a coolant) flows is in contact with the thermally conductive member.

That is, the heat exchange member is in contact with a specific region of the thermally conductive member excluding the end of the heat exchange member coupled to the sealing part, and therefore, it is possible to further accelerate the heat dissipation of the battery cell while not increasing the thickness of the battery cell.

Preferably, the thermally conductive member is bent to partially wrap the heat exchange member at the end of the thermally conductive member opposite to a region of the thermally conductive member coupled to the sealing part.

Since the thermally conductive member is bent to partially wrap the heat exchange member at the end of the thermally conductive member opposite to a region of the thermally conductive member coupled to the sealing part, the heat dissipation of the battery cell through the thermally conductive member and the heat exchange member is further easily achieved. Consequently, the above-described structure is more effectively applicable to a middle- or large-sized battery module manufactured by stacking a plurality of battery cells.

In accordance with another aspect of the present invention, there is provided a middle- or large-sized battery module having a high power and large capacity, wherein the battery module includes the above-described battery cell as a unit cell.

The middle- or large-sized battery module may be used as a power source for devices which require high-power and large-capacity electricity and to which external forces, such as vibration and impact, are applied. Preferably, the middle- or large-sized battery module is used as a power source for electric vehicles or hybrid electric vehicles.

The structure of the middle- or large-sized battery module and a method of manufacturing the middle- or large-sized battery module are well known in the art to which the present invention pertains, and therefore, a detailed description thereof will not be given.

BRIEF DESCRIPTION OF THE DRAWINGS

The above and other objects, features and other advantages of the present invention will be more clearly understood from the following detailed description taken in conjunction with the accompanying drawings, in which.

MODE FOR THE INVENTION

Now, preferred embodiments of the present invention will be described in detail with reference to the accompanying drawings. It should be noted, however, that the scope of the present invention is not limited by the illustrated embodiments.

Figure 1:
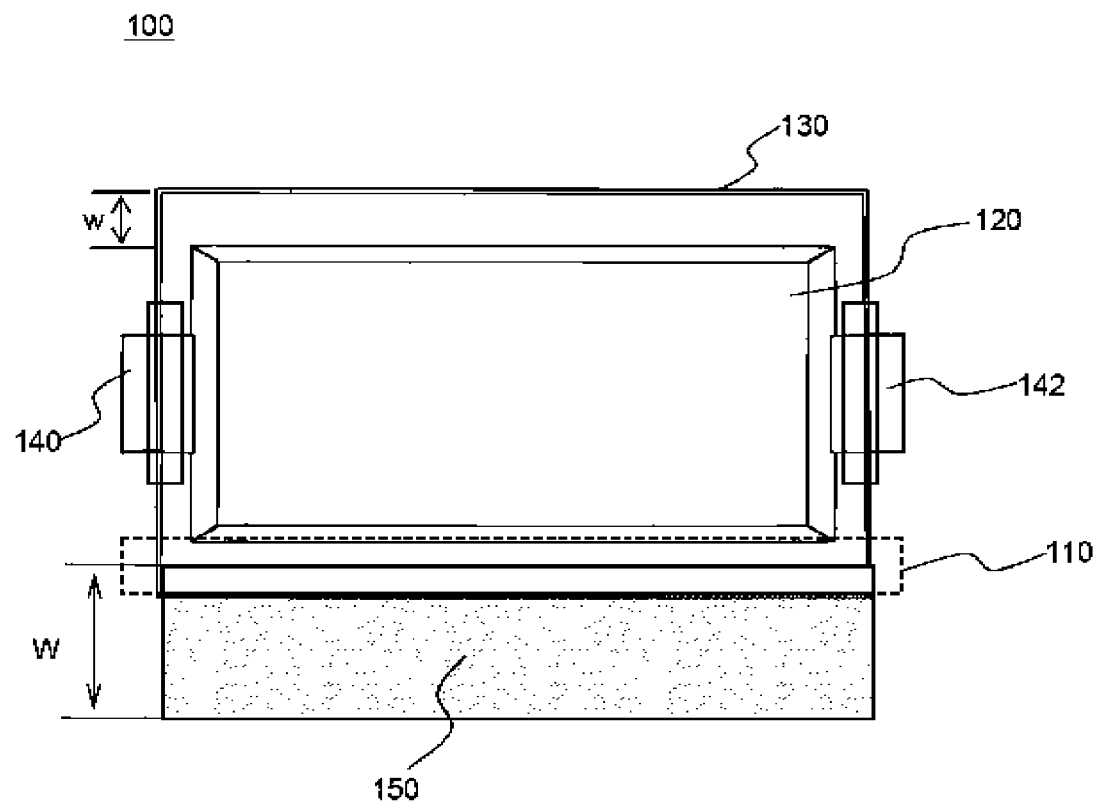
FIG. 1 is a plan view typically illustrating a battery cell according to a preferred embodiment of the present invention.

FIG. 1 is a plan view typically illustrating a battery cell according to a preferred embodiment of the present invention.

Referring to FIG. 1, the battery cell 100 includes an electrode assembly 120 of a cathode/separator/anode structure, mounted in a battery case 130 formed of a laminate sheet, electrode terminals 140 and 142 extruding out of the battery case 130, and a thermally conductive member 150 coupled to a sealing part 110 of the battery case 130 where the electrode terminals 140 and 142 are not located.

The thermally conductive member 150 has a width W greater than the width w of the sealing part 110, with the result that it is possible to secure a large heat dissipation surface area. Consequently, heat generated during the charge and discharge of the electrode assembly 120 is discharged to the outside through the sealing part 110 and the thermally conductive member 150, which is formed in the shape of a plate.

Figure 2:
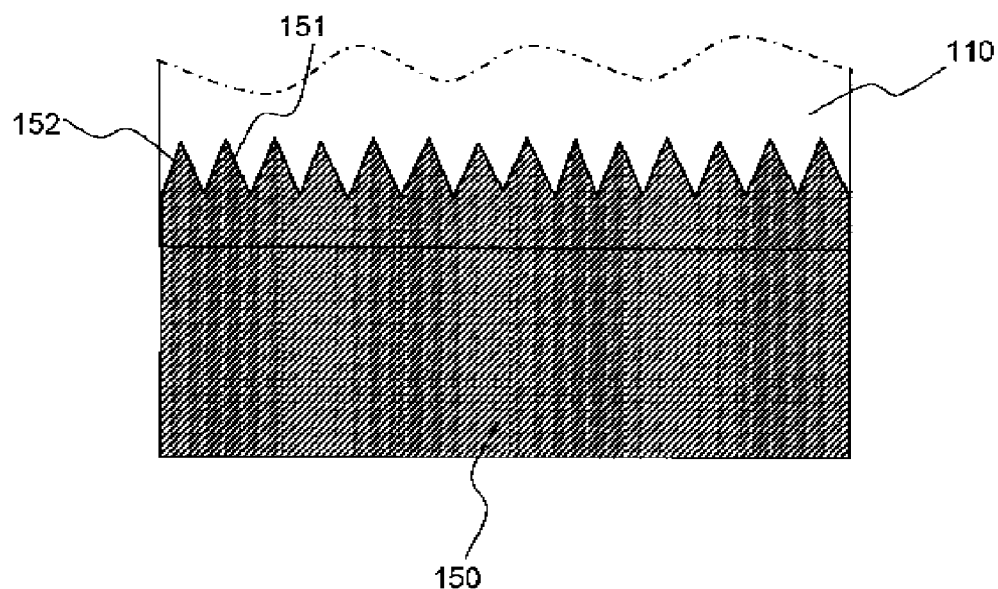
FIG. 2 is a plan view typically illustrating a coupling region between a thermally conductive member and a sealing part of a battery case according to another preferred embodiment of the present invention.

FIG. 2 is a plan view typically illustrating a coupling region between a thermally conductive member and a sealing part of a battery case according to another preferred embodiment of the present invention.

Referring to FIG. 2, the coupling region between the sealing part 110 of the battery case and the thermally conductive member 150 is constructed in a saw-toothed concavo-convex structure 152 on a horizontal plane. Consequently, when the thermally conductive member 150 is inserted between upper and lower laminate sheets (not shown) of the battery case and then is welded to the upper and lower laminate sheets, contact interfaces 151 between the upper and lower laminate sheets and between the thermally conductive member 150 and the respective laminate sheets, and therefore, it is possible to increase a coupling force between the thermally conductive member 150 and the laminate sheets while securing a large thermally welded area between respective laminate sheets.

Figure 3:
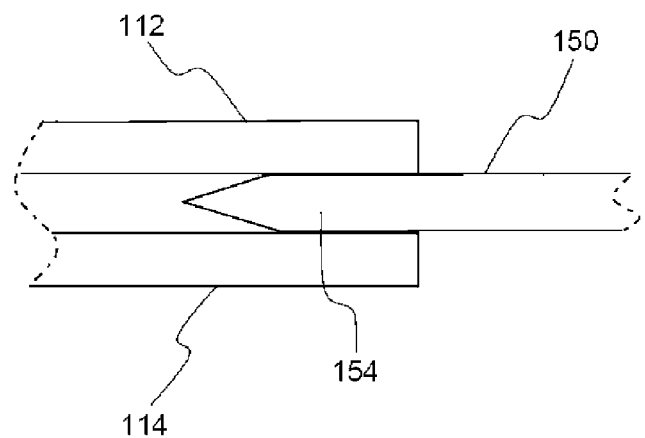
FIGS. 3 to 5 are vertical sectional views typically illustrating coupling regions between the thermally conductive member and the sealing part of the battery case according to other preferred embodiments of the present invention.
Figure 4:
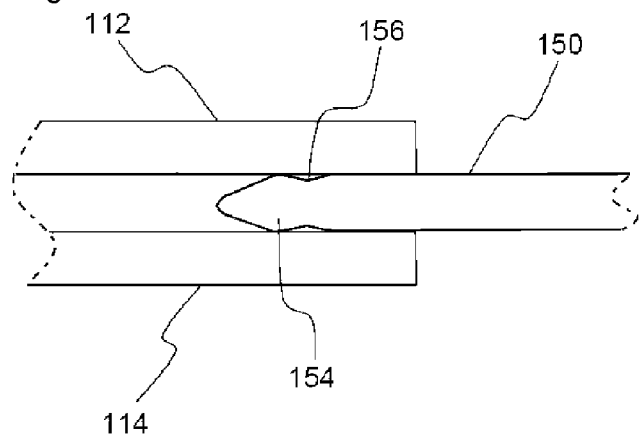
Figure 5:
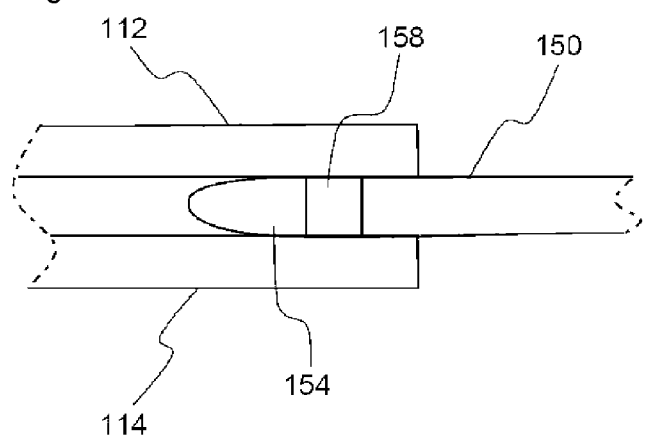

FIGS. 3 to 5 are vertical sectional views typically illustrating coupling regions between the thermally conductive member and the sealing part of the battery case according to other preferred embodiments of the present invention.

Referring first to FIG. 3, an end 154 of the thermally conductive member 150 is thermally welded to an upper laminate sheet 112 and a lower laminate sheet 114 of the sealing part of the battery case while the end 154 of the thermally conductive member 150 is interposed between the upper laminate sheet 112 and the lower laminate sheet 114.

Referring to FIG. 4, the end 154 of the thermally conductive member 150 is constructed in a concavo-convex structure 156 on a vertical sectional plane. Consequently, when the end 154 of the thermally conductive member 150 is welded to the upper laminate sheet 112 and the lower laminate sheet 114, it is possible to provide a high coupling force between the thermally conductive member and the laminate sheets due to the large coupling interfaces.

Referring to FIG. 5, one or more through-holes 158 are formed in the end 154 of the thermally conductive member 150. Consequently, some of the upper laminate sheet 112 and some of the lower laminate sheet 114 are directly thermally welded to each other via the through-holes 158, thereby further increasing a coupling force between the thermally conductive member and the laminate sheets.

Figure 6:
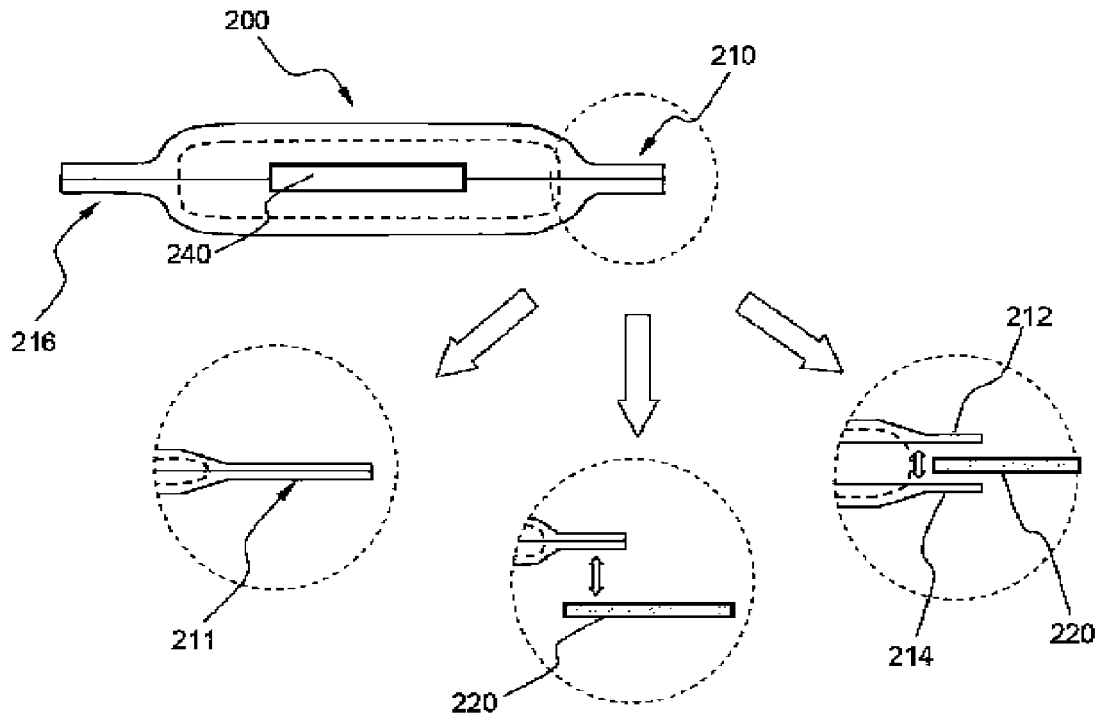
FIG. 6 typically illustrates various structures of a battery cell according to various preferred embodiments of the present invention.

FIG. 6 typically illustrates various structures of a battery cell according to various preferred embodiments of the present invention.

Referring to FIG. 6, a sealing part 210 of the battery cell 200 where an electrode terminal 240 is not located may be constructed in three different structures to accelerate heat dissipation.

In the first structure, one side sealing part 211 extends such that the one side sealing part 211 is longer than the other side sealing part 216. In the second structure, a thermally conductive member 220 is coupled to the bottom of the sealing part 210. In the third structure, an end of the thermally conductive member 220 is thermally welded to an upper laminate sheet 212 and a lower laminate sheet 214 of the sealing part 210 while the end of the thermally conductive member 220 is interposed between the upper laminate sheet 212 and the lower laminate sheet 214.

Figure 7:
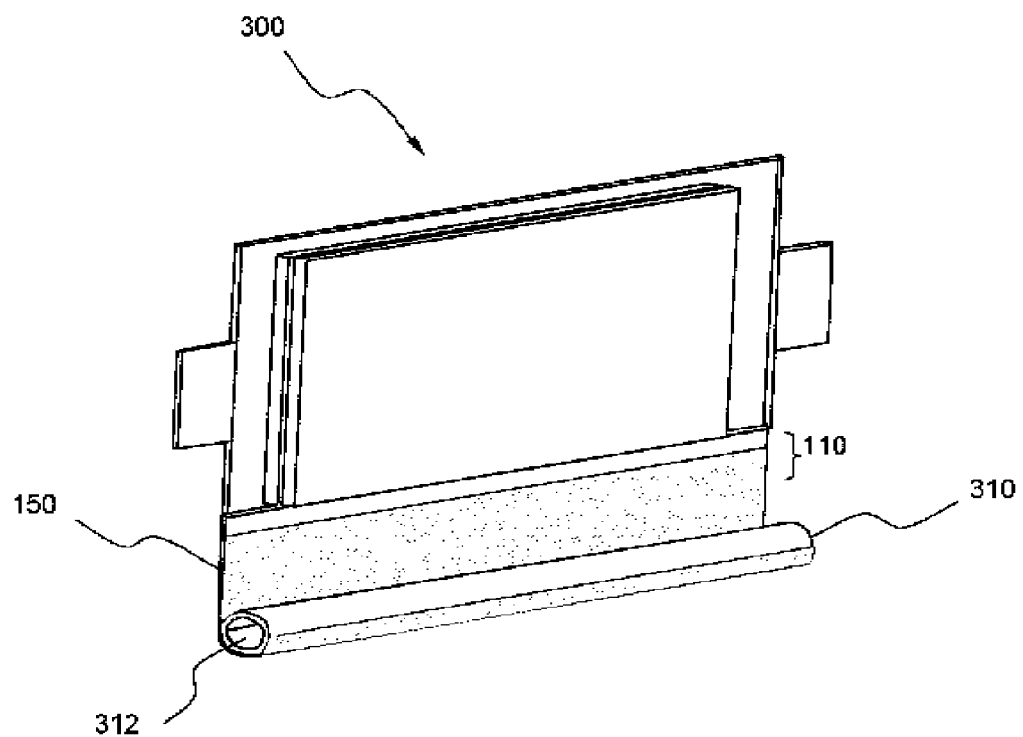
FIG. 7 is a perspective view illustrating a battery cell constructed in a structure in which a heat exchange member is further coupled to the battery cell of FIG. 1.

FIG. 7 is a perspective view illustrating a battery cell constructed in a structure in which a heat exchange member is further coupled to the battery cell of FIG. 1.

Referring to FIG. 7, the plate-shaped thermally conductive member 150 is coupled to a specific region of the sealing part 110 of the battery cell 300. An end of the thermally conductive member 150 is bent to partially wrap the heat exchange member 310 having a channel 312 through which a coolant flows. In this structure, therefore, it is possible to further accelerate the dissipation of heat from the battery cell 300 while not increasing the thickness of the battery cell 300. Consequently, the battery cell of this structure is effectively applicable to a middle- or large-sized battery module (not shown).

INDUSTRIAL APPLICABILITY

As apparent from the above description, the battery cell according to the present invention is constructed in a structure to accelerate heat dissipation by the heat conduction through at least some of the sealing part of the battery case where no electrode terminals are located. Consequently, it is possible to effectively improve heat dissipation efficiency while not increasing the thickness of the battery cell.

Furthermore, it is possible to manufacture a battery cell of which the heat dissipation efficiency is improved in a simple structure. In this case, it is possible to uniformly control the internal temperature of the battery cell. Consequently, it is possible to greatly improve the life span and safety of the battery cell.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A battery cell comprising:
   a battery case;
   an electrode assembly of a cathode/separator/anode structure mounted in the battery case, the electrode assembly formed of a laminate sheet including a resin layer and a metal layer;
   electrode terminals connected to the electrode assembly, the electrode terminals extruding out of the battery case;
   a first sealing part where the electrode terminals are located; and a second sealing part where the electrode terminals are not located;

wherein the battery cell has a structure to accelerate heat dissipation by the heat conduction through the second sealing part, wherein the structure to accelerate heat dissipation comprises a thermally conductive member coupled to the second sealing part, and wherein the thermally conductive member is a plate-shaped member having a width greater than the width of the second sealing part, and at least some of the thermally conductive member is thermally welded to the laminate sheet while being interposed between upper and lower parts of the laminate sheet.

2. The battery cell according to claim 1, wherein the laminate sheet includes an inner resin layer, which is thermally weldable, an isolation metal layer, and an outer resin layer exhibiting excellent durability.

3. The battery cell according to claim 1, wherein at least some of the thermally conductive member is joined to the second sealing part.

4. The battery cell according to claim 1, wherein the thermally conductive member has an outer circumferential end thermally welded to the second sealing part, and the outer circumferential end of the thermally conductive member is constructed in a concavo-convex structure in a plane parallel to the laminate sheet, thereby increasing a coupling force between the thermally conductive member and the laminate sheet while securing a large thermally welded area between the upper and lower parts of the laminate sheet.

5. The battery cell according to claim 1, wherein the thermally conductive member has an outer circumferential end thermally welded to the second sealing part, and the outer circumferential end of the thermally conductive member is constructed in a concavo-convex structure in a plane perpendicular to the laminate sheet, thereby increasing a coupling force between the thermally conductive member and the laminate sheet.

6. The battery cell according to claim 1, wherein the thermally conductive member has an outer circumferential end thermally welded to the second sealing part, and one or more through-holes are formed in the outer circumferential end of the thermally conductive member such that the upper and lower parts of the laminate sheet are partially thermally welded to each other via the through-holes.

7. The battery cell according to claim 1, wherein the thermally conductive member is formed of a metal or carbon plate or a polymer sheet containing metal powder or carbon powder.

8. The battery cell according to claim 1, wherein the thermally conductive member is constructed in a structure to contact a heat exchange medium.

9. The battery cell according to claim 8, wherein the structure to contact the heat exchange medium is a structure in which a heat exchange member having a channel through which the heat exchange medium flows is in contact with the thermally conductive member.

10. The battery cell according to claim 9, wherein the thermally conductive member is bent to partially wrap the heat exchange member at the end of the thermally conductive member opposite to a region of the thermally conductive member coupled to the second sealing part.

11. A middle- or large-sized battery module having a high power and large capacity, wherein the battery module includes the battery cell according to claim 1 as a unit cell.

12. The battery cell according to claim 1, wherein the thermally conductive member extends outwardly from the battery cell.

13. A battery cell comprising:

a battery case;

an electrode assembly of a cathode/separator/anode structure mounted in the battery case, the electrode assembly formed of a laminate sheet including a resin layer and a metal layer;

electrode terminals connected to the electrode assembly, the electrode terminals extruding out of the battery case;

a first sealing part where the electrode terminals are located; and a second sealing part where the electrode terminals are not located;

wherein the battery cell has a structure to accelerate heat dissipation by the heat conduction through the second sealing part, wherein the structure to accelerate heat dissipation comprises a thermally conductive member coupled to the second sealing part, and wherein the first sealing part is on a first side of the battery case and the second sealing part in on a second side of the battery case.

14. A battery cell comprising:

a battery case;

an electrode assembly of a cathode/separator/anode structure mounted in the battery case, the electrode assembly formed of a laminate sheet including a resin layer and a metal layer;

electrode terminals connected to the electrode assembly, the electrode terminals extruding out of the battery case;

a first sealing part where the electrode terminals are located;

a second sealing part where the electrode terminals are not located; and a thermally conductive member coupled to the second sealing part, wherein the thermally conductive member is spaced from the electrode terminals and comprises a plate-shaped member to accelerate heat dissipation.

\* \* \* \* \*